| United States Patent [19] | [11] Patent Number: 4,765,547 |
|---|---|
| Marui et al. | [45] Date of Patent: Aug. 23, 1988 |

[54] APPARATUS FOR SEPARATING FIBER FROM FIBER AGGREGATE

[75] Inventors: Tomohiro Marui; Tadao Kaneko; Kazuo Ao; Toshio Shimono; Seiichiro Fukada, all of Tokyo, Japan

[73] Assignee: Kawasaki Steel Corporation, Hyogo, Japan

[21] Appl. No.: 27,802

[22] Filed: Mar. 19, 1987

[30] Foreign Application Priority Data

Mar. 31, 1986 [JP] Japan .................. 61-46277

[51] Int. Cl.<sup>4</sup> .................. B02C 19/12; B02C 19/06
[52] U.S. Cl. .................. 241/40; 241/69; 241/101 B
[58] Field of Search .................. 241/101 B, 5, 39, 40, 241/101.2, 69

[56] References Cited

U.S. PATENT DOCUMENTS

| 258,912 | 6/1882 | Goessling | 241/40 |
|---|---|---|---|
| 3,013,735 | 12/1961 | Janson | 241/40 X |
| 3,371,448 | 3/1968 | Christensen | 241/40 X |

FOREIGN PATENT DOCUMENTS

| 1094977 | 5/1955 | France | 241/40 |
|---|---|---|---|
| 181760 | 10/1983 | Japan . | |

Primary Examiner—Mark Rosenbaum
Attorney, Agent, or Firm—Austin R. Miller

[57] ABSTRACT

An apparatus for separating fibers from a fiber aggregate comprises a hollow cylindrical apparatus housing defining therein a dissolving chamber. A partition is disposed in the internal space of the apparatus housing and forms the bottom of the dissolving chamber. The partition defines a plurality of through openings, through which fibers separated from the aggregate passes. The apparatus housing has an aggregate inlet to introduce the aggregate to be dissolved with pressurized air. The pressurized air carrying the aggregates is discharged toward the partition and forms swirl flow in the dissolving chamber. By the swirl flow of the air, the aggregate flows to collide onto the partition with an impact. This impact serves as an energy for causing dispersion or dissolving of the aggregate. The partition is preferably formed with elastically or resiliently deformable material for absorbing impact upon the collision of the aggregate thereonto so as not to cause destroying of each individual fiber. Further preferably, a contact plate is suspended on the elastically or resiliently deformable partition. The contact plate opposes the aggregate inlet so that the aggregate introduced into the dissolving chamber will collide onto the contact plate.

30 Claims, 3 Drawing Sheets

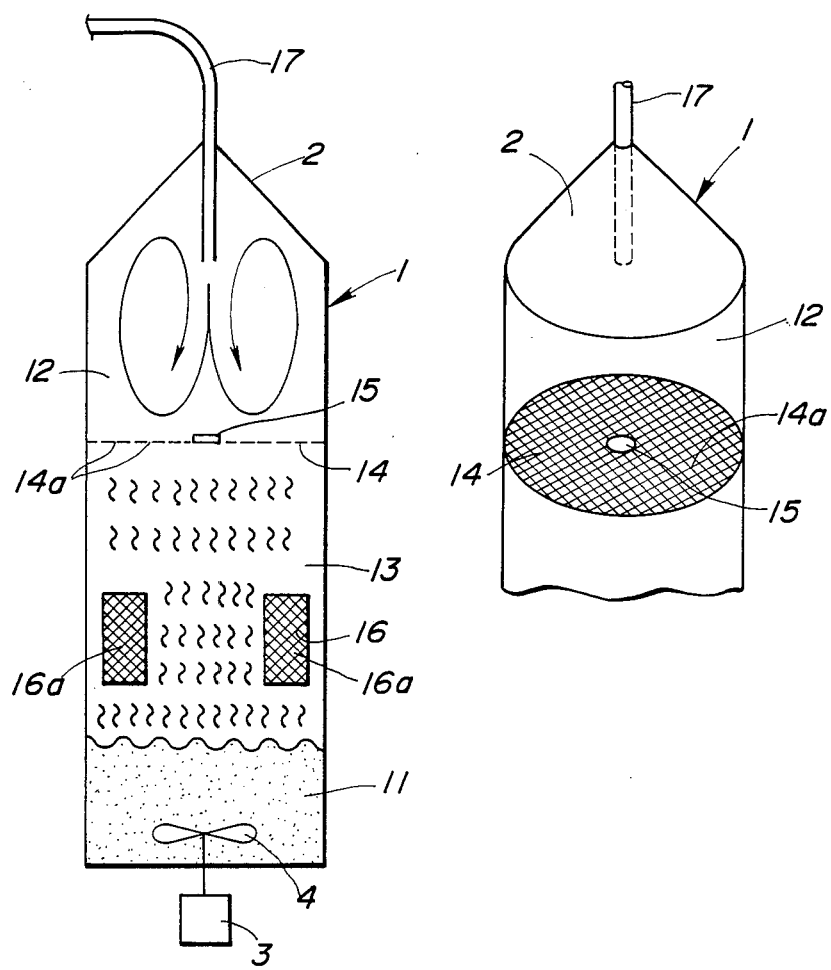

APPARATUS FOR SEPARATING FIBER FROM FIBER AGGREGATE

BACKGROUND OF THE INVENTION

1. Field of the Invention

The present invention relates generally to an apparatus for separating individual fibers from a fiber aggregate. More specifically, the invention relates to an apparatus for separating fiber, such as carbon fiber made from coal pitch, from a mat-form or candy fluff-form fiber agregate for enabling use of individual fibers in independent form. And more particularly, the invention relates to a method for producing fiber-reinforced concrete or fiber-reinforced gypsum material, in which a supply of carbon fibers separated from the aggregate is integrated.

2. Description of the Background Art

Fiber, such as carbon fiber, is known to be a good reinforcement material. For example, carbon fibers are utilized for forming fiber-reinforced concrete or fiber-reinforced gypsum board. On the other hand, carbon fiber can be produced from various materials in various ways. For example, carbon fiber can be produced from coal pitch, this type will be hereafter referred to as "coal pitch carbon fiber". Such coal pitch carbon fiber is cheap to produce and thus is advantageous to use in various fields from the viewpoint of cost. However, on the other hand, such coal pitch carbon fiber has relatively short fiber length and is produced in forms of a candy fluff-form or mat-form aggregate. Such fiber aggregate tends to become unevenly distributed within the concrete or gypsum and thus leading to non-uniformity of strength within the concrete or the gypsum board to be produced.

On the other hand, there are various ways for producing long carbon fibers. When long carbon fiber is used for forming the material for fiber-reinforced concrete or gypsum, the carbon fiber is cut into lengths of 5 to 10 mm. Since carbon fiber has a diameter of 8 to 80 microns and a specific gravity of 1.2 to 1.9, the cut fiber tends to aggregate during cutting operation or during packaging. Therefore, even using the long fibers, the same or similar problems arise when forming the material for the concrete or gypsum.

In order to solve the aforementioned problem, a method is proposed for separating the individual carbon fibers from aggregate and supplying them to concrete, mortar, gypsum and so forth, in Japanese Patent First Publication No. 58-181760. In the proposed method, a plurality of needle like projections are provided on opposing surfaces of movable members. The carbon fiber aggregates passes through the spaces between the projections of the movable members which are positioned to overlap opposing set projections. The overlapped projections serve as a comb for separating individual fibers from the aggregates. However, this proposed system cannot completely separate the individual fibers and thus is not suitable for practical use.

SUMMARY OF THE INVENTION

Therefore, it is a principle object of the present invention to provide an apparatus which can completely sunder and aggregate into its individual fibers.

Another object of the invention is to provide an apparatus which is simple in construction but effective in dissolving the fiber aggregate.

A further object of the invention is to provide a method for forming fiber-reinforced concrete, mortar, gypsum in which can provide satisfactorily uniform of distribution of the fibers.

In order to accomplish the aforementioned and other objects, an apparatus for separating fibers from a fiber aggregate, according to the invention, comprises a hollow cylindrical apparatus housing defining therein a separating chamber. A partition is disposed within the apparatus housing and forms the bottom of the separating chamber. The partition defines a plurality of through openings, through which fibers separated from the aggregate pass. The apparatus housing has an aggregate inlet to introduce the aggregate to be separated via pressurized air. The pressurized air carrying the aggregates is discharged toward the partition and forms a toroidal flow in the separating chamber. The toroidal flow of the air causes the aggregate to impact onto the partition. This impact serves to sunder the aggregate into its component fibers.

In the preferred construction, the partition is formed with elastically or resiliently deformable material for absorbing some of the impact of the aggregate colliding thereon so as not to destroy the individual fibers. Further preferably, a contact plate is suspended by the elastically or resiliently deformable partition. The contact plate opposes the aggregate inlet so that the aggregate introduced into the dissolving chamber will impact on the contacting plate first.

Individual fibers separated from the aggregate as set forth above can be transferred for use in independent form. When the fiber is to be used as reinforcement material for concrete, a concrete mixing chamber is formed below the dissolving chamber in communication with the latter through the partition. In the mixing chamber, the concrete is continuously stirred for mixing the fibers falling down through the partition. On the other hand, when the separated fibers are to be mixed with powder cement, gypsum or so forth, a mixing chamber is defined beneath the separation chamber in communication through the partition. Powder state material, e.g. cement, gypsum or so forth, are introduced into the mixing chamber via a pressurized carrier gas to form turbulence in the mixing chamber. The mixture of the material and the fiber is then transferred to a reservoir or hopper.

According to one aspect of the invention, the apparatus for separating fiber from an aggregate comprises means for defining a cylindrical chamber, means for introducing a fiber aggregate into the cylindrical chamber, the fiber aggregate introducing means having an outlet directed downwardly, means for defining a plurality of through openings through a bottom of the cylindrical chamber and providing an impact surface opposing the outlet, and means for forcing the fiber aggregate to repeatedly collide with the impact surface for dissolving the aggregate into individual fibers.

The bottom of the cylindrical chamber is formed of a material which can absorb shock upon collision of the aggregate onto the impact surface. The means for forcing the fiber aggregate to collide with the impact surface is carrier gas which carries the aggregate through the fiber aggregate introducing means with a given gas pressure and generates swirl within the cylindrical chamber for repeatedly colliding the fiber aggregate onto the impact surface. The bottom of the cylindrical chamber is formed of a meshed structure having a mesh size suitable for allowing the separated fiber to pass therethrough. In the preferred construction, the meshed structure is formed of cloth net.

According to another aspect of the invention, an apparatus for forming a mixture of fluid state material with fiber, comprises means for defining a cylindrical fiber dissolving chamber, means for introducing a fiber aggregate into the fiber dissolving chamber, the fiber aggregate introducing means having an outlet located within the fiber dissolving chamber and directed downwardly, means for defining a plurality of through openings through a bottom of the fiber dissolving chamber and providing a plane opposing the outlet, means for defining a mixing chamber for mixing fibers separated in the fiber dissolving chamber with the fluid state material, the mixing chamber being located below the fiber dissolving chamber and communicating with the fiber dissolving chamber via the openings in the bottom of the dissolving chamber, means for forcing the fiber aggregate to repeatedly collide with a plane for dissolving the aggregate into individual fibers, and means, provided in the mixing chamber for stirring the material and fiber for establishing the mixture.

The material is a liquid state material filled in the mixing chamber and constantly stirred by means of the mixing means, and the fiber separated from the aggregate in the fiber dissolving chamber is supplied to the liquid state material. In the specific example, the material is a liquid state concrete and the fiber is a carbon fiber. The carbon fiber is made from a coal pitch.

In the alternative, the material is a powder state material. In order to introduce the mixing powder state material, the apparatus further comprises means for introducing the powder state material into the mixing chamber. The mixing means generates swirl within the mixing chamber for mixing the fiber supplied through the opening of the fiber dissolving chamber and the powder state material through the powder state material introducing means. In the specific application, the material is a powder cement and the fiber is a carbon fiber.

According to a further aspect of the invention, an apparatus for preparing a material for forming fiber-reinforced concrete comprises means for defining a cylindrical carbon fiber dissolving chamber, means for introducing a carbon fiber aggregate into the carbon filter dissolving chamber, the carbon fiber aggregate introducing means having an outlet located within the carbon fiber dissolving chamber and directed downwardly, means for defining a plurality of through openings through a bottom of the carbon fiber dissolving chamber and providing a plane opposing the outlet, means for defining a mixing chamber for mixing carbon fiber separated in the carbon fiber dissolving chamber with the fluid state concrete material, the mixing chamber being located below the carbon fiber dissolving chamber and communicating with the carbon fiber dissolving chamber via the openings in the bottom of the dissolving chamber, means for forcing the carbon fiber aggregate to repeatedly collide with a plane for dissolving the aggregate into individual carbon fibers, and means, provided in the mixing chamber for stirring the concrete material and carbon fiber for establishing the mixture.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIG. 1 is a side view of the preferred embodiment of a fiber separating apparatus according to the present invention;

FIG. 2 is a fragmentary perspective illustration showing application of the preferred embodiment of the fiber separating apparatus for supplying separated fibers to mix with a fluid-state material;

DESCRIPTION OF THE PREFERRED EMBODIMENT

Figure 3:
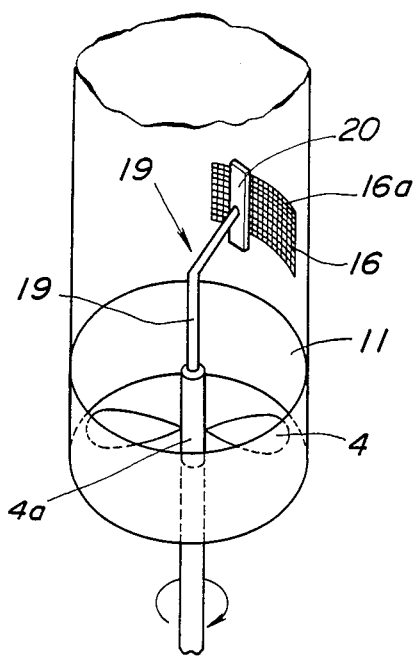
FIG. 3 is a partial perspective illustration of the apparatus of FIG. 2.

Referring now to the drawings, particularly to FIG. 1, the preferred embodiment of a fiber separating apparatus, according to the invention, has a generally cylindrical apparatus housing 1 with a cone-shaped top section 2. An aggregate separating chamber 12 is defined within the apparatus housing 1. The bottom of the aggregate dissolving chamber 12 is constituted by a partition 14. The partition 14 may take a net-form, a mesh-form or a porous-form (in experiments non-metallic mesh such as cloth or synthetic fiber mesh or netting proved to be best) and defines a plurality of fiber paths 14a. In the preferred construction, the partition is made of an essentially flexible material suitable for being elastically or resiliently deformed. The size of the openings formed through the partition 14 is selected to allow a desired length of fiber to pass therethrough. A disc-shaped contact plate 15 is provided at about the center of the partition. The contact plate 15 has a planar contact surface.

In the preferred embodiment, the contact plate 15 is located at the center of the partition 14. Opposing the contact surface of the contact plate 15, an induction pipe 17 is inserted vertically through the top of the cone-shaped top section 2. The induction pipe 17 is designed to define a section of the flowpath of the aggregate and carrier gas and discharge the aggregate with the carrier gas into the dissolving chamber 12. The gas flow discharged from the induction pipe 17 is directed toward the contact surface of the contact plate 15 to cause the aggregate to impact on the contact surface.

The flow of the carrier gas is deflected by the contact plate 15 and the partition thus generating a toroidal flow within the dissolving chamber 12. As will be appreciated, the toroidal flow of the carrier gas in the dissolving chamber 12 perpetuated by the subsequently introduced flow of aggregate and carrier gas causes the aggregate carried therein to collide repeatedly with the contact surface of the contact plate 15. When colliding with the contact surface, part of the fibers in the aggregate are separated from the aggregate. At this time, since part of the air passes through the openings 14a formed through the partition and the size of these openings is selected to allow the separated fibers to pass, the separated fibers pass through the openings in the partition 14. Therefore, the separated fibers can be removed from the separating chamber.

FIG. 2 shows a practical application of the preferred embodiment of the apparatus for separating the fiber from the aggregate as set forth above. In the disclosure for the practical embodiment of FIG. 2, the features common to those illustrated in FIG. 1 will be represented by the same reference numerals to avoid redundant recitation.

In the shown embodiment, the preferred embodiment of the fiber separating apparatus is adapted to dissolve a carbon fiber aggregate for forming a carbon fiber-reinforced concrete. Therefore, a mixing chamber 11 is defined within the apparatus housing 1. The mixing chamber 11 is filled with a liquid or fluid state concrete. So as to prevent the concrete in the mixing chamber from solidifying and to establish a mixture having uniform fiber distribution, a mixing vane 4 is inserted within the mixing chamber. The mixing vane 4 is driven by a mixer motor 3. Thereby, the concrete in the mixing chamber 11 is continuously stirred.

The mixing chamber 11 is in communication through the partition 14 and an intermediate transfer section 13 with the dissolving chamber 12. In the transfer section 13, one or more ventilation window 16 opens to ventilate the carrier gas therethrough. The ventilation window 16 is covered with a fine mesh a screen or a net. The net 16a prevents the fibers from flowing out of the apparatus housing 1. Therefore, the separated individual fibers fall onto and are stirred into the concrete in mixing chamber 11.

In the preferred construction, the height of the transfer section 13 is longer than the height of the separating chamber 12. This arrangement avoids influence from the toroidal flow in the separating chamber 12 on carrier gas flow in the transfer section 13. By this, the fiber supply rate to every part of surface of the concrete becomes substantially uniform.

In the preferred construction, a sweeper 20 is provided in the transfer section 13. The sweeper 20 (FIG. 3) comprises a rotary shaft 19 arranged coaxially with a rotary axle 4a of the mixing vane 4 for rotation therewith. The rotary shaft 19 is bent at the top toward the inner periphery of the apparatus housing 1 and carries a sweeper head 20 at the free end thereof. The sweeper head 20 is vertically located at the height corresponding to the height of the ventilation windows 16 to contact the surface of the net 16a.

With the construction set forth above, the rotary shaft 19 is driven with the mixing vane 4 by means of the mixer motor 5 to move the sweeper head 20 along the inner periphery of the apparatus housing 1. Since the sweeper head 20 moves over the ventilation windows 16, carbon fibers stuck to the net 16a of the ventilation window by the gas flow therethrough can be swept off to fall onto the concrete. This assures ventilation of the carrier gas.

Herebelow the compression strength of a concrete sample produced by the foregoing embodiment of the apparatus of FIG. 2, will be compared with a sample produced by conventional process. The carbon fiber used for forming the sample which was a coal pitch carbon fiber available from Kureha Chemical Co., Ltd. had a fiber length of 10 mm, a fiber diameter of 14.5μ, a specific gravity of 1.63 and a tensile strength of 7800 kg/cm$^2$. The carbon fiber was obtained in the form of carbon fiber aggregate and separated by the fiber separating apparatus of FIG. 2 and supplied to a mixture of rapid-curing cement, water and powder silica sand in the mixing chamber. The mixture had a cement/water weight ratio of 100:50 and a cement/sand weight ratio of 100:25. The volume of the mixture used for forming the sample was 500 g. Samples were formed having 1%, 3% and 5% carbon fiber contents. Supply period was about 10 min.

Comparative samples were prepared of the same concrete prepared in the conventional process. For forming the comparative samples, carbon fiber in the aggregate form was supplied to the same composite of concrete in a ratio of 1%, 3% and 5%. Methylcellulose as a viscosity increasing agent and also an antifoaming agent were added. The mixture was stirred utilizing an Omnimixer (Tradename) available from Chiyoda Giken Kogyo Co., Ltd.

Figure 4:
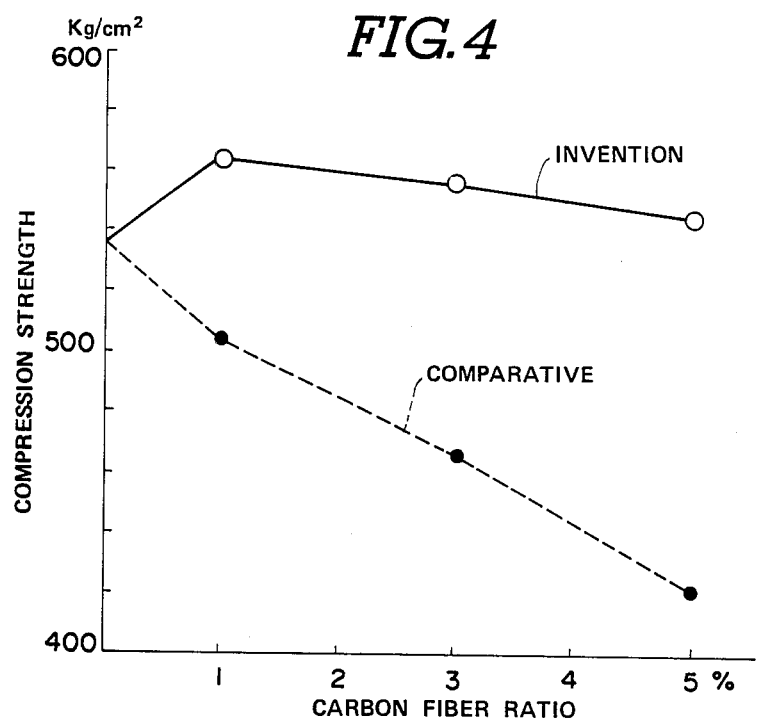
FIG. 4 is a graph showing the compression stress of a sample made from a mixture of cement, silica sand and the separated carbon fiber prepared by the apparatus of FIG. 2 comparing the same with a sample formed by a conventional process.

Each sample was cured in a molding of 40×40×160 mm for about 24 hours. The samples have been removed from the molding after 24 hours and cured for 7 days under a temperature of 20° C.±3° C. After 7 days curing, compression stress test has been performed according to a testing method according to JISR 5201. The result of the testing is shown in FIG. 4. As will be seen from FIG. 4, in the comparative samples the compression stress was lowered with increase of the carbon fiber ratio. On the other hand, in the samples formed of the concrete prepared by the inventive apparatus, it was observed that the compression stress was increased while increasing the ratio of the carbon from zero to 1.

Figure 5:
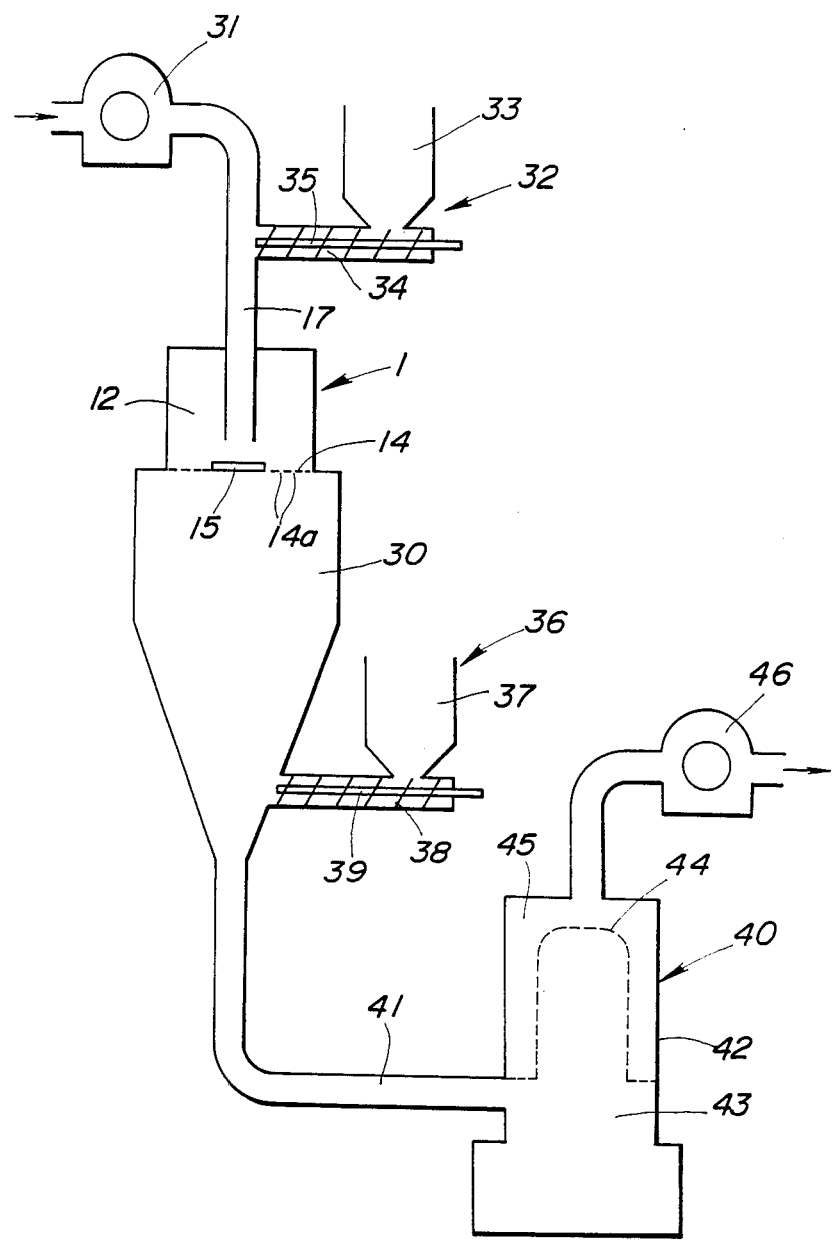
FIG. 5 is a diagrammatical illustration of the preferred embodiment of the fiber separating apparatus as combined with an apparatus for mixing the separated fiber with a powder state material.

FIG. 5 shows another embodiment of the fiber separating apparatus as combined with an apparatus for mixing the separated fiber with a powder, such as cement powder. The fiber separating apparatus of FIG. 5 has basically identical construction to that illustrated in FIGS. 1 and 2. Therefore, the features common to the foregoing embodiments are represented by the same reference numerals for avoiding redundant recitation.

As will be seen from FIG. 5, the apparatus housing 1 of the fiber separating apparatus is formed integrally with a reducer 30. The apparatus housing 1 is formed of a cylindrical configuration with a flat top. The induction pipe 17 which is inserted into the separating chamber 12 through the top of the apparatus housing 1 at one end, is connected to a blower 31 at the other end. A fiber aggregate feeder assembly 32 is connected to the induction pipe 17 for introducing a controlled amount of fiber aggregate into the induction pipe. The feeder assembly 32 comprises a hopper 33 and a feed pipe 34. The feed pipe 34 has an axial opening into which a spiral feeder 35 is inserted to form a so-called screw-feeder.

Though the specific embodiment employs a screw-feeder for supplying the fiber aggregate into the induction pipe, it can be replaced by any appropriate type of feeder such as an ejector feeder and so forth.

On the other hand, a power feeder assembly 36 is connected to the reducer 30. The feeder assembly 36 comprises a hopper 37 and a feeder pipe 38. A spiral feeder 39 is inserted through the feeder pipe 38 for introducing the powder into the reducer 30. The lower end of the reducer is connected to a collector 40 via a connecting pipe 41. The collector 30 comprises a collector housing 42 defining therein a collector chamber 43. A bag filter 44 is disposed within the collector housing 42 to define the collecting chamber within the internal periphery of the collector housing. At the opposite side of the bag filter, a ventilation chamber 45 is defined for ventilating the carrier gas. The ventilation chamber 45 is connected to a drafting blower 46. The drafting blower 46 creates low pressure in the ventilation chamber for ventilating the carrier gas therethrough.

As will be seen from FIG. 5, the reducer 30 has greater diameter than the fiber separating apparatus housing 1 at the upper section. On the other hand, the lower section of the reducer 30 is formed into a basically funnel shaped configuration to concentrate the separated fibers toward the inlet of the connecting pipe 41. The powder feeder pipe 38 is connected to the lower section of the reducer 30 to supply the powder, such as cement powder, to be mixed therein with the separated fibers. Since the lower section of the reducer is formed in the funnel-shaped configuration as set forth above flow resistance against the carrier gas flow increased. Turbulence generated thereby combines the powder and fiber to form a uniform fiber/powder mixture.

Therefore, as will be appreciated from the above-discussion, the fiber separating apparatus according to the invention fulfills all of the objects and advantages sought.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An apparatus for separating fiber from an aggregate comprising:
   means defining a cylindrical chamber;
   means for introducing fiber aggregate into said cylindrical chamber, said fiber aggregate introducing means having an outlet directed downwardly;
   separating means defining a plurality of through openings through a bottom portion of said cylindrical chamber and providing an impact surface opposing said outlet, said bottom portion of said cylindrical chamber being formed of a material which can absorb the shock of collision of said aggregate onto said impact surface so as to maintain an average length of the separated fiber longer than or equal to a predetermined length; and
   fiber moving means for forcing said fiber aggregate to repeatedly collide with said separating means for separating said aggregate into individual fibers.

2. An apparatus for separating fiber from an aggregate as set forth in claim 1, wherein said means for forcing said fiber aggregate to collide with said separating means is a carrier gas which carries said aggregate through said fiber aggregate introducing means with a given gas pressure and generates turbulence within said cylindrical chamber for repeatedly colliding said fiber aggregate onto said separating means.

3. An apparatus for separating fibers from an aggregate as set forth in claim 2, wherein said bottom of said cylindrical chamber is formed of a meshed structure having a mesh size suitable for allowing the separated fibers to pass therethrough.

4. An apparatus for separating fibers from an aggregate as set forth in claim 3, wherein said meshed structure is formed of cloth net.

5. An apparatus for forming a mixture of fluid state material with fiber, comprising:
   means for defining a cylindrical fiber dissolving chamber;
   means for introducing a fiber aggregate into said fiber dissolving chamber, said fiber aggregate introducing means having an outlet located within said fiber dissolving chamber and directed downwardly;
   means for defining a plurality of through openings through a bottom of said fiber dissolving chamber and providing an impact surface opposing said outlet;
   means for defining a mixing chamber for mixing fiber separated in said fiber dissolving chamber with said fluid state material, said mixing chamber being located below said fiber dissolving chamber and communicating with said fiber dissolving chamber via said openings in said bottom of said dissolving chamber;
   means for forcing said fiber aggregate to repeatedly collide with said impact surface for dissolving said aggregate into individual fibers; and
   means, provided in said mixing chamber for stirring said material and fiber for establishing said mixture.

6. An apparatus as set forth in claim 5, wherein said bottom of said fiber dissolving chamber is formed of a material which can absorb shock upon collision of said aggregate onto said impact surface.

7. An apparatus as set forth in claim 6, wherein said means for forcing said fiber aggregate to collide with said plane is carrier gas which carries said aggregate through said fiber aggregate introducing means with a given gas pressure and generates swirl within said fiber dissolving chamber for repeatedly colliding said fiber aggregate onto said impact surface.

8. An apparatus as set forth in claim 7, wherein said bottom of said fiber dissolving chamber is formed of a meshed structure having a mesh size suitable for allowing to pass the separated fiber therethrough.

9. An apparatus as set forth in claim 8, wherein said meshed structure is formed of cloth net.

10. An apparatus as set forth in claim 5, wherein said material is a liquid located in said mixing chamber and stirred by means of said mixing means, and said fibers separated from said aggregate in said fiber dissolving chamber are supplied to said liquid.

11. An apparatus as set forth in claim 10, wherein said material is a liquid state concrete and said fiber is a carbon fiber.

12. An apparatus as set forth in claim 11, wherein said carbon fiber is made from a coal pitch.

13. An apparatus as set forth in claim 5, wherein said material is a powder state material.

14. An apparatus as set forth in claim 13, which further comprises means for introducing said powder state material into said mixing chamber.

15. An apparatus as set forth in claim 14, wherein said mixing means generates swirl within said mixing chamber for mixing said fiber supplied through said opening of said fiber dissolving chamber and said powder state material through said powder state material introducing means.

16. An apparatus as set forth in claim 15, wherein said material is a powder cement and said fiber is a carbon fiber.

17. An apparatus as set forth inclaim 16, wherein said carbon fiber is made from a coal pitch.

18. An apparatus for preparing a material for forming fiber-reinforced concrete comprising:

means for defining a cylindrical carbon fiber dissolving chamber;

means for introducing a carbon fiber aggregate into said carbon fiber dissolving chamber, said carbon fiber aggregate introducing means having an outlet located within said carbon fiber dissolving chamber and directed downwardly;

means for defining a plurality of through openings through a bottom of said carbon fiber dissolving chamber and providing an impact surface opposing said outlet;

means for defining a mixing chamber for mixing carbon fibers separated in said carbon fiber dissolving chamber with said fluid state concrete material, said mixing chamber being located below said carbon fiber dissolving chamber and communicating with said carbon fiber dissolving chamber via said openings in said bottom of said dissolving chamber;

means for forcing said carbon fiber aggregate to repeatedly collide with said impact surface for dissolving said aggregate into individual carbon fibers; and means, provided in said mixing chambers, for stirring said concrete material and carbon fibers for establishing said mixture.

19. An apparatus as set forth in claim 18, wherein said bottom of said carbon fiber dissolving chamber is formed of a concrete material which can absorb shock upon collision of said aggregate onto said impact surface.

20. An apparatus as set forth in claim 19, wherein said means for forcing said carbon fiber aggregate to collide with said plane is a carrier gas which carries said aggregate through said carbon fiber aggregate introducing means with a given gas pressure and generates swirl within said fiber dissolving chamber for repeatedly colliding said fiber aggregate onto said impact surface.

21. An apparatus as set forth in claim 20, wherein said bottom of said fiber dissolving chamber is formed of a meshed structure having a mesh size suitable for allowing the separated fiber to pass therethrough.

22. An apparatus as set forth in claim 21, wherein said meshed structure is formed of cloth net.

23. An apparatus as set forth in claim 18, wherein said concrete material is a liquid state concrete material located in said mixing chamber and continuously stirred by means of said mixing means, and said fiber separated from said aggregate in said fiber dissolving chamber is supplied to said liquid state concrete material.

24. An apparatus as set forth in claim 23, wherein said concrete material is a liquid state concrete and said fiber is a carbon fiber.

25. An apparatus as set forth in claim 24, wherein said carbon fiber is made from a coal pitch.

26. An apparatus as set forth in claim 18, wherein said concrete material is a powder state concrete material.

27. An apparatus as set forth in claim 26, which further comprises means for introducing said powder state concrete material into said mixing chamber.

28. An apparatus as set forth in claim 27, wherein said mixing means generates swirl within said mixing chamber for mixing said fibers supplied through said opening of said fiber dissolving chamber and said powder state material through said powder state material introducing means.

29. An apparatus as set forth in claim 28, wherein said carbon fiber is made from a coal pitch.

30. An apparatus for separating fibers from an aggregate comprising:

means defining a hollow chamber;

means for introducing a fiber aggregate into said hollow chamber, said fiber aggregate introducing means having an outlet directed downwardly;

means defining a plurality of through openings through a bottom of said hollow chamber and providing an impact surface opposing said outlet, said bottom of said hollow chamber being formed of a material which can absorb the shock of collision of said aggregate onto said impact surface so as to maintain an average length of the separated fiber longer than or equal to a predetermined length; and means for forcing said fiber aggregate to repeatedly collide with said impact surface for separating said aggregate into individual fibers.

* * * * *